United States Patent [19]
Ziegler

[11] Patent Number: 5,602,622
[45] Date of Patent: Feb. 11, 1997

[54] ALIGNABLE NEGATIVE STAGE FOR A PHOTOGRAPHIC ENLARGER

[76] Inventor: William R. Ziegler, 417 Shirley Way, Menlo Park, Calif. 94025

[21] Appl. No.: 361,146

[22] Filed: Dec. 21, 1994

Related U.S. Application Data

[63] Continuation-in-part of Ser. No. 23,889, Feb. 26, 1993, Pat. No. 5,376,989.
[51] Int. Cl.⁶ .................................................. G03B 27/62
[52] U.S. Cl. ............................................................. 355/75
[58] Field of Search .................................. 355/75, 76, 53

[56] References Cited

U.S. PATENT DOCUMENTS

| | | | |
|---|---|---|---|
| 4,015,903 | 4/1977 | Zimmet et al. | 355/72 |
| 4,965,631 | 10/1990 | Ozawa | 355/75 |
| 5,448,332 | 9/1995 | Sakakibara et al. | 355/53 |

*Primary Examiner*—Arthur T. Grimley
*Assistant Examiner*—David A. Lane
*Attorney, Agent, or Firm*—R. Russel Austin

[57] ABSTRACT

A negative stage comprises a lower platform and an upper platform. Each of the platforms includes an aperture for allowing passage of light through the platform from a light source in the enlarger. The platforms are aligned in a face-to-face relationship with the apertures generally in alignment. The platforms are spaced-apart by a fixed pivot-member and two adjustable support-members extendable in a direction generally perpendicular to the platforms for adjusting spacing and alignment of the platforms. In one embodiment the upper platform is retained in contact with the pivot-member and adjusting screws by spring loaded plungers. The spring loaded retaining arrangement allows relative movement between the platforms for alignment while still retaining the platforms firmly in contact with the pivot-member and adjusting screws.

5 Claims, 9 Drawing Sheets

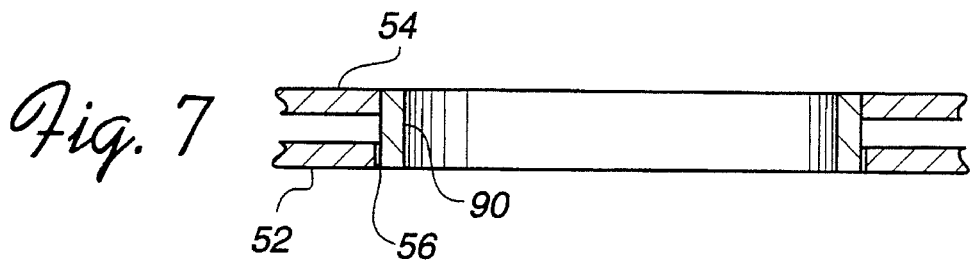
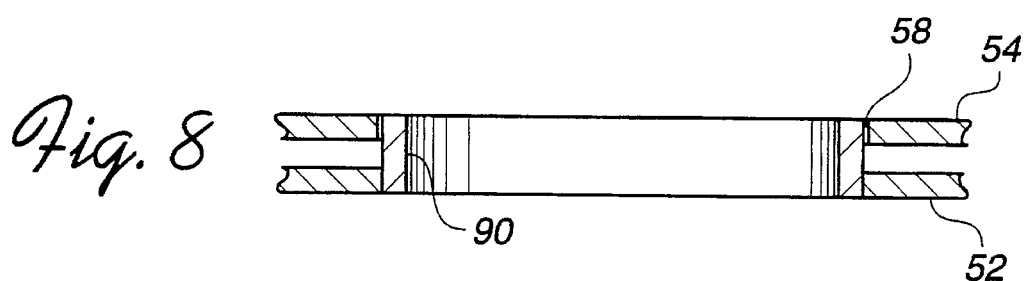
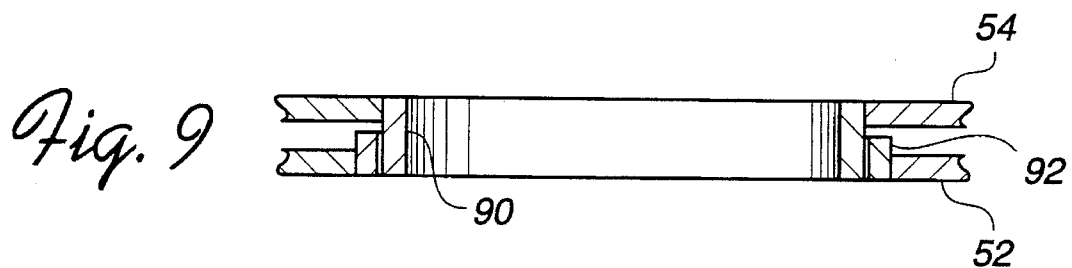
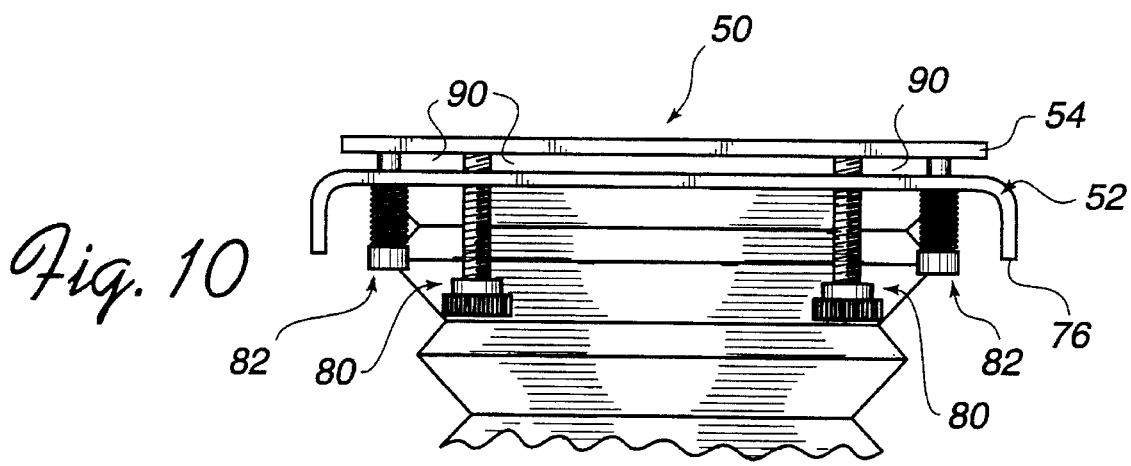

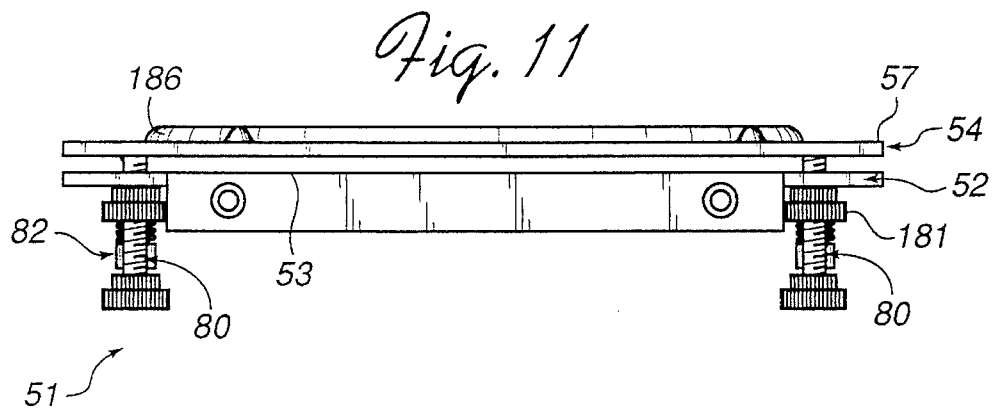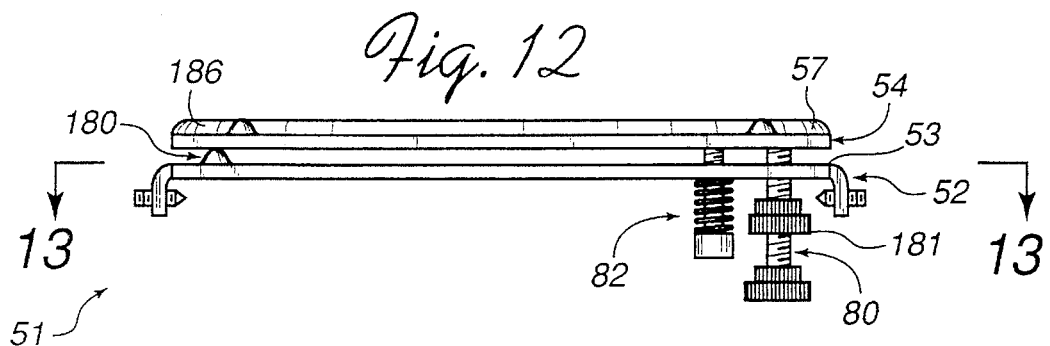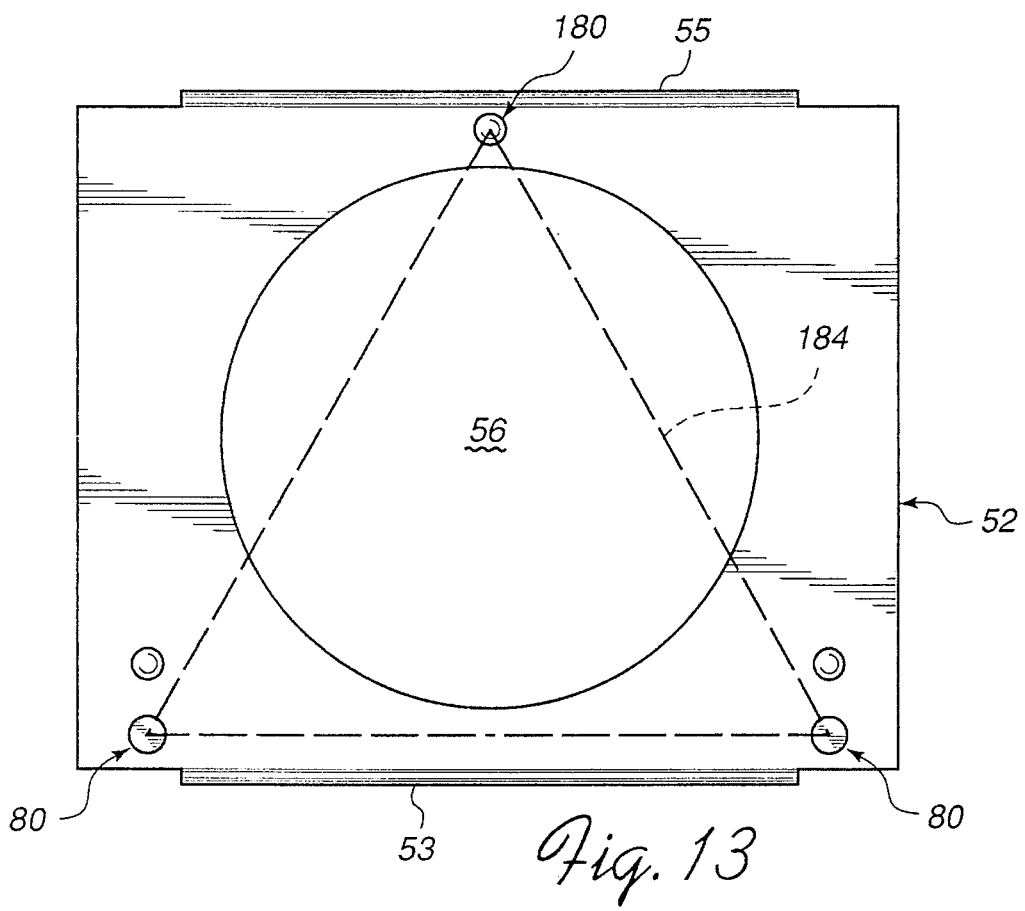

ALIGNABLE NEGATIVE STAGE FOR A PHOTOGRAPHIC ENLARGER

CROSS-REFERENCE TO PRIOR APPLICATIONS

This application is a continuation-in-part of U.S. patent application Ser. No. 08/023,889, filed Feb. 26, 1993 now U.S. Pat. No. 5,376,989.

BACKGROUND OF THE INVENTION

The present invention relates in general to photographic enlarger apparatus. In particular, it relates to an alignable negative stage for a photographic enlarger.

In making high quality photographic prints or enlargements using a photographic enlarger, highest quality for the prints or enlargements is best achieved when a negative being printed is accurately aligned, i.e., parallel with, the plane of an enlarging lens in the enlarger, and parallel with the plane of paper receiving a projected image of the negative.

Commercially produced photographic enlargers are generally not supplied with alignment devices. It is frequently assumed by an enlarger user that necessary planes in the enlarger are aligned by the enlarger's manufacturer. A user generally adjusts only the enlarger's focus during use. This is generally accomplished by closely scrutinizing the projected image from the negative being enlarged, and adjusting a focus control until the sharpest overall image is obtained.

It is now possible to obtain, commercially, optical apparatus for precisely aligning principal planes of a photographic enlarger, such as the negative plane and the lens plane. One such apparatus is discussed in U.S. Pat. No. 5,075,862, which discloses a optical device which may be attached to one principal plane, and is cooperative with a mirror attached to another principal plane. A user looks through the optical device and adjusts the appropriate planes until a series of concentric circles is observed, indicating that the planes are parallel. This allows the planes to be fine aligned with a high degree of accuracy.

While this alignment operation may appear from the description to be relatively easy, it is in fact complicated severely by the fact that most commercial enlargers are constructed such that their principal planes are not readily adjustable. Generally, alignment of the planes may only be accomplished, at best, by loosening and re-tightening screws that are used to assemble and coarse-align the enlarger at the manufacturer's plant, or, at worst, by forcefully twisting or bending structural components of the enlarger.

It is not uncommon during enlarger operations to hold photographic paper, for receiving the projected image from the enlarger, on a platform or easel which is placed in position on an enlarger base. This easel may be aligned easily by means of shims or the like, or by adjustable feet attached thereto. An easel is generally heavy and rigid and, once aligned by any of the suggested methods, will remain firmly in position on the enlarger base under its own weight.

A particularly useful addition to an enlarger, either as an accessory or an integral component, would be a fine alignable negative stage. Given the availability of such a stage, at least two principle planes, i.e. the negative plane and the paper plane would be easily fine alignable and these two planes would be readily fine alignable with the lens plane whether or not the lens plane was alignable. Generally it is not.

SUMMARY OF THE INVENTION

It is an object of the present invention to provide an alignable negative stage for a photographic enlarger.

It is another object of the present invention to provide an alignable negative stage which may be used as an accessory with an existing enlarger, or incorporated in an enlarger as an integral component thereof.

It is a further object of the present invention to provide an alignable negative stage which may be useable with optical apparatus designed to facilitate accurate enlarger alignment.

The above and other objects are accomplished by providing, in one embodiment of the invention, a negative stage comprising a generally flat lower platform and a generally flat upper platform, each of the platforms having an aperture therein for allowing passage of light therethrough from a light source in the enlarger.

The platforms are aligned in a face-to-face relationship, with the apertures therein generally in alignment. The platforms are spaced apart by at least three support-members, at least two thereof are extendable in a direction generally perpendicular to the platforms for adjusting relative spacing and alignment of the platforms. Means are provided for maintaining the platforms in contact with the support-members.

Preferably, the negative stage includes a light-baffle arrangement disposed around the apertures in the platforms and extending between the platforms for preventing leakage of light therebetween.

In one preferred embodiment of the invention, the platforms are each generally rectangular and of about the same rectangular dimensions. Each of the platforms has two opposite generally straight sides, and first and second ends. Three support-members are provided by a pivot member and two adjusting screws, the adjusting screws extending generally perpendicularly through the lower platform via mating threaded apertures therein. The two adjusting screws are located proximate the first end of the lower platform, and the pivot-member is located proximate the second end of the lower platform.

Preferably, spring loading means are provided for maintaining the platforms in contact with the support means. A preferred spring loading means includes two shafts, each thereof having first and second ends. Each of the shafts is attached at the first end thereof to the upper platform and extends freely through the lower platform via a corresponding aperture therein, such that a lower portion of each shaft extends below the lower platform. Each lower portion of each shaft has a coil spring arranged axially therearound, and means are provided at the second end of each shaft for maintaining the coil spring in compression against the lower platform.

The above-described preferred embodiment of the negative stage of the present invention is preferably installed in the enlarger with the first end of the lower platform facing a user. Thus installed, the two adjusting screws are easily accessible to the user and may be simultaneously adjusted, for simultaneous aligning the stage in two orthogonally opposed inclinations.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 7 is a cross-section view seen generally in the direction 7—7 of FIG. 2 schematically illustrating a baffle arrangement in the negative stage of FIG. 3.

FIGS. 8 and 9 are cross-section views depicting alternate arrangements of baffles in a negative stage in accordance with the present invention.

FIG. 10 is a fragmentary side elevation view schematically illustrating one method of installing the negative stage of FIG. 3 as an integral part of a photographic enlarger of the type depicted in FIG. 1.

FIG. 11 is a front elevation view schematically illustrating another embodiment of a negative stage in accordance with the present invention.

FIG. 12 is a side elevation view schematically illustrating the negative stage of FIG. 11.

FIG. 13 is a simplified sectional view schematically illustrating the negative stage of FIG. 11, seen generally in the direction 13—13 of FIG. 12.

DETAILED DESCRIPTION OF THE INVENTION

As discussed above, the present invention is designed to be cooperative with optical alignment apparatus for facilitating alignment of principal planes in a photographic enlarger. Such apparatus is described in detail in U.S. Pat. No. 5,075,862, the complete disclosure of which is hereby incorporated by reference.

Figure 1:
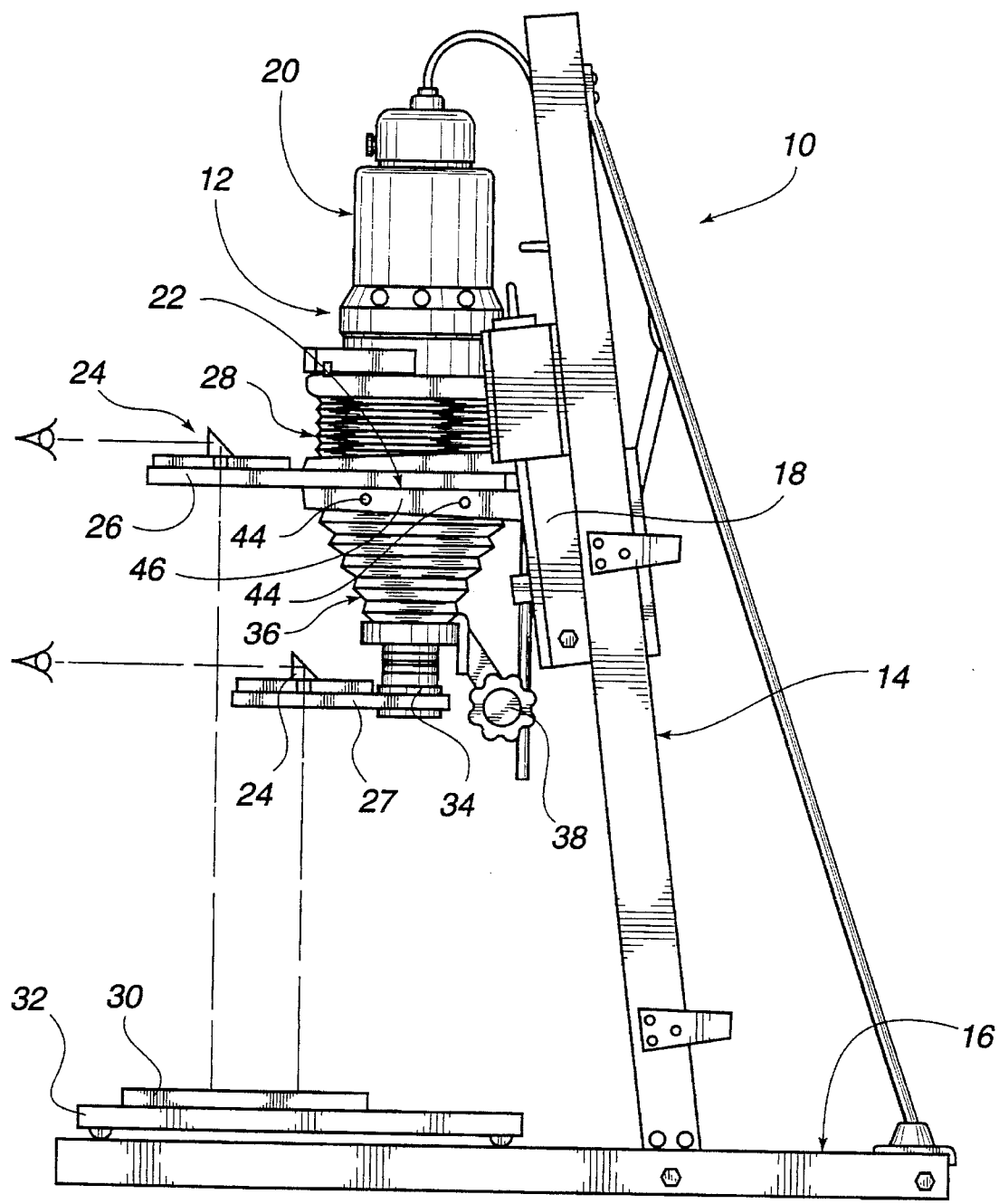
FIG. 1 is side elevation view showing prior art optical alignment apparatus installed in prior art photographic enlarger apparatus.

Referring now to the drawings, wherein like components are designated by like reference numerals, principal components of such apparatus, installed in a photographic enlarging apparatus, are depicted in FIG. 1. Here, an enlarger 10 includes an enlarger head 12 attached to a frame 14 which is mounted on a base 16. A head carrier 18 is provided for moving enlarger head 12 up and down on frame 14. Enlarger 10 is generally representative of a type "D5" enlarger available from the Omega-Arkay Company.

Enlarger head 12 includes a lamp housing 20, including a lamp (not shown) which provides a source of light for illuminating a photographic negative (not shown). The negative would normally be placed on a negative platform 22 which, as explained further below, is not readily adjustable.

For aligning such apparatus, optical alignment apparatus 24 may be mounted on a transparent plate 26 which is inserted between a bellows extension 28 of lamp housing 20, and negative platform 22. The optical alignment apparatus 24 is cooperative with a mirror which rests on a easel 32. The easel rests, in turn, on base 16. For completeness it is pointed out that optical apparatus 24 may also be attached to a lens stage 34 by means of a transparent plate 27 attached to the lens stage. Once the desired planes have been aligned, the optical apparatus may be removed and a negative placed on negative platform 22 for projection.

Figure 2:
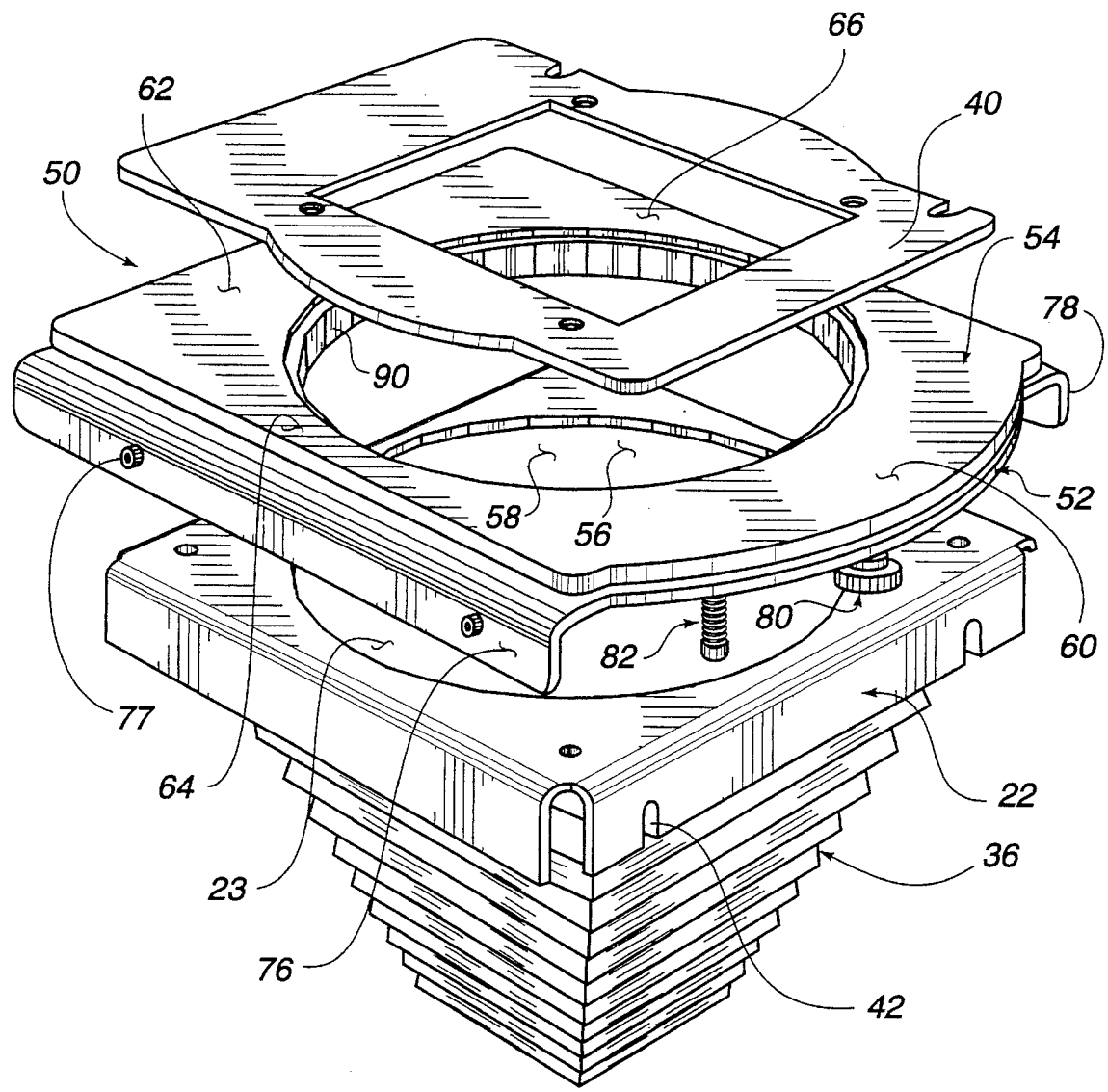
FIG. 2 is an exploded perspective view from above schematically illustrating one preferred embodiment of an alignable negative stage in accordance with the present invention together with cooperative components of the enlarger apparatus of FIG. 1.

Referring now to FIG. 2, negative platform 22 is usually attached directly to a bellows unit 36, extending between the negative platform and lens stage 34. Bellows unit 36 permits vertical lens travel, for focussing, and is adjusted by a knob 38 (see FIG. 1). An aperture 23 in negative platform 22 permits light from lamp housing 20 to pass through the platform to the lens stage.

Figure 1A:
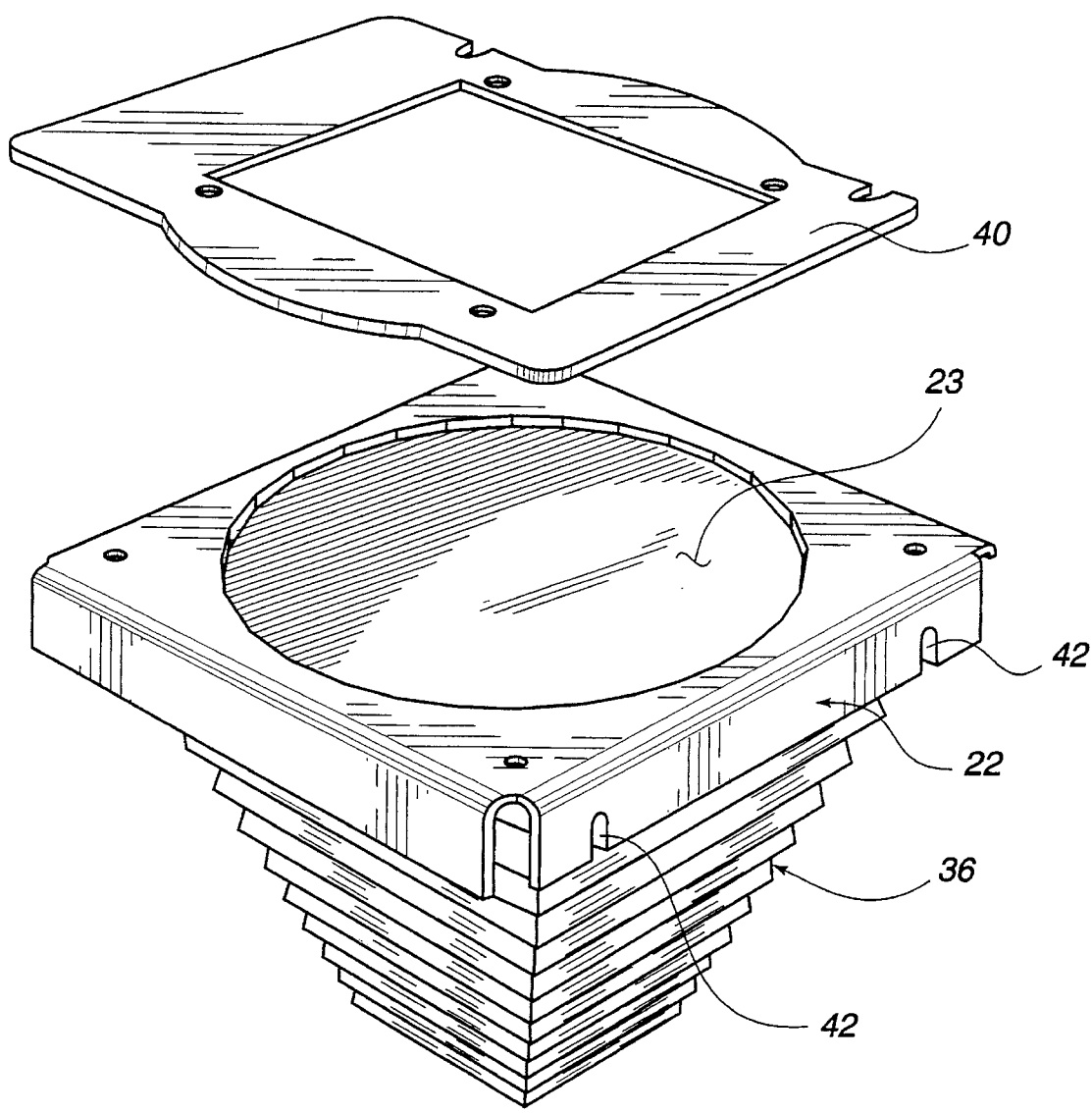
FIG. 1A is an exploded perspective view showing a prior art negative platform and a negative holder for the enlarger apparatus of FIG. 1

Referring again to FIG. 1A, typically, a negative to be reproduced is placed on a negative holder 40 and held in position on the holder by a similar holder (not shown), which effectively clamps the negative, by its edges, between the two holders.

Continuing with reference to FIG. 1A and again to FIG. 1, in the type "D5" enlarger, a negative platform 22 is provided with slots 42 which are used in combination with screws 44 (see FIG. 1) to attach the platform (and attached bellows unit 36) to arms 46, (only one visible in FIG. 1) which extend from head carrier 18. The slots are included to provide some measure of adjustability for negative platform 22, primarily for coarse alignment of the platform by the manufacturer. It will be evident, however, to those familiar with the photographic art, that it may be very difficult to perform fine alignment when screws 44 must be loosened, and platform 22 manually pushed and pulled on arms 46 to do so.

Further, if fine alignment is eventually obtained by such a clumsy process, it is often lost when screws 44 are re-tightened to clamp platform 22 in position as, due to the re-tightening, the platform is often warped and twisted. If the platform is thus warped and twisted, there is no guarantee that a negative holder placed thereon will lie in the same orientation as plate 26 of the optical alignment apparatus initially used to determine alignment.

Referring now to FIGS. 2, 3, 4, and 5, one preferred embodiment 50 of an alignable negative stage in accordance with the present invention is illustrated. This particular embodiment is designed as an accessory for a "D5" type enlarger or the like. It is configured for mounting over existing negative platform 22 in enlarger 10.

Principal features of the embodiment include a generally flat lower platform 52 and a generally flat upper platform 54. Apertures 56 and 58 in respectively lower and upper platforms 52 and 54 are aligned with each other. This allows passage of light therethrough from the light source in lamp housing 20 of enlarger head 12. When negative stage 50 is installed in enlarger 10, apertures 56 and 58 are, in turn, aligned with aperture 23 in negative platform 22.

Figure 4:
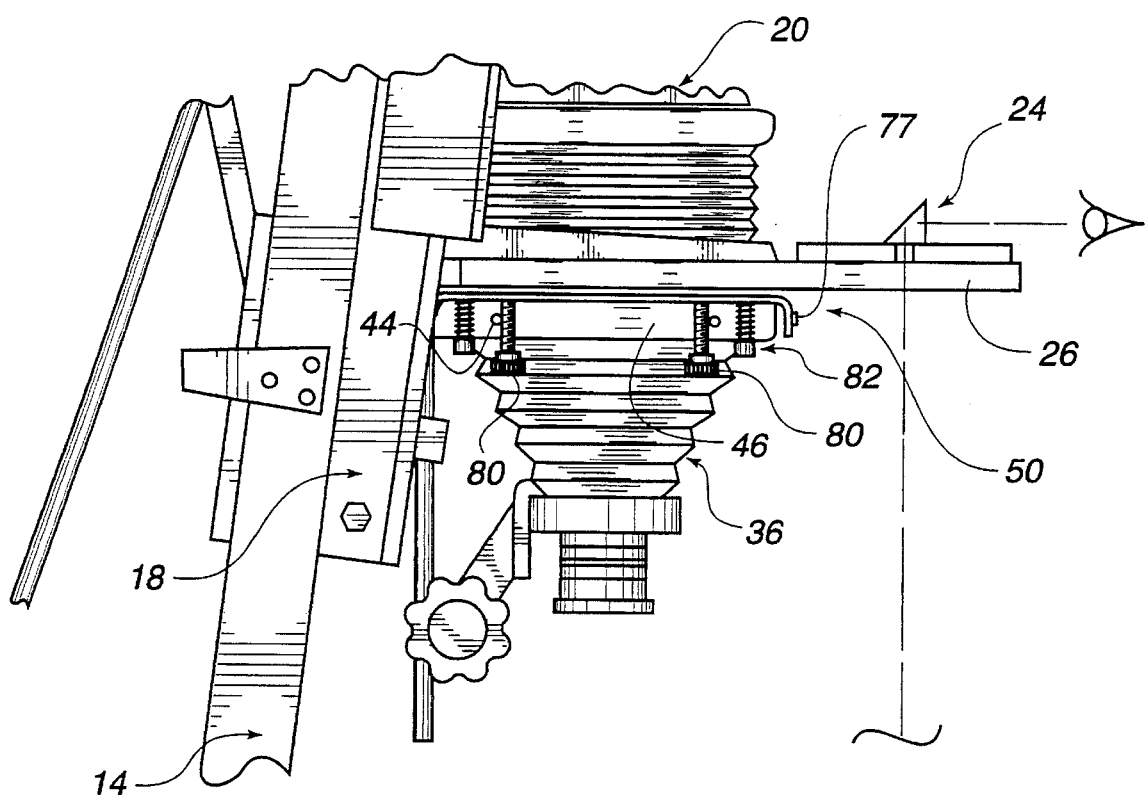
FIG. 4 is a fragmentary side elevation view schematically illustrating the negative stage of FIG. 3 installed in the photographic enlarger of FIG. 1 together with optical alignment apparatus depicted in FIG. 1.
Figure 5:
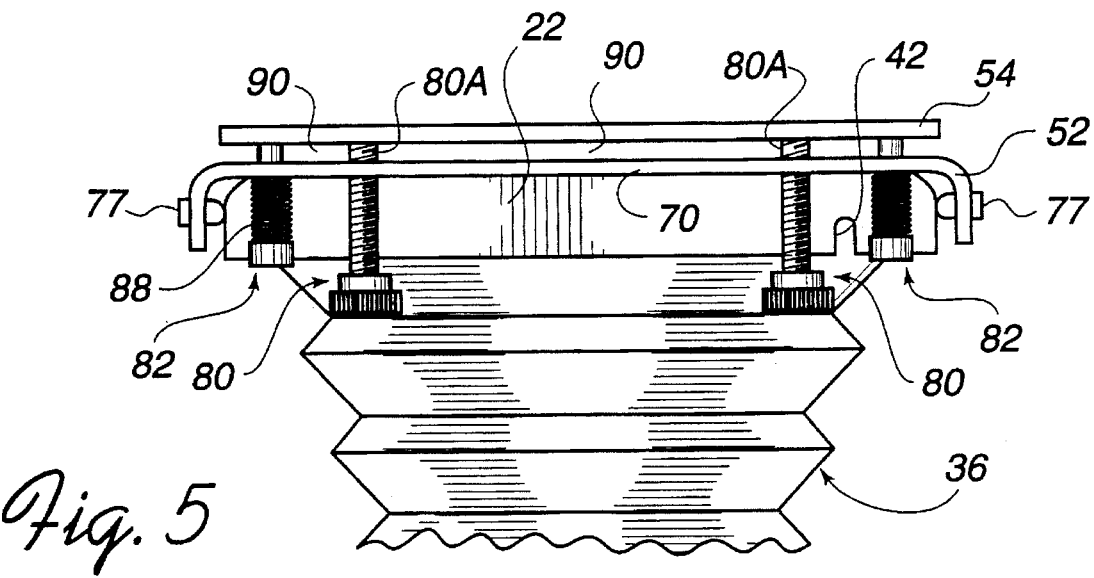
FIG. 5 is a fragmentary side elevation view schematically illustrating the negative stage of FIG. 3 installed in the photographic enlarger of FIG. 1 and illustrating means for securing the negative stage in position on the apparatus.

Lower and upper platforms 52 an 54 are preferably generally rectangular, with one end thereof slightly rounded. Upper platform 54 preferably has a length between ends 60 and 62 of about 8.25 inches and a width between sides 64 and 66 of about 8.0 inches. Apertures 56 and 58 preferably have a diameter of about 6.0 inches. Referring to FIG. 2, lower platform 52 preferably also has a length of about 8.25 inches between ends 68 and 70 and a width between sides 72 and 74 of about 8.0 inches. In this respect, the platforms have generally the same rectangular dimensions. Lower platform 52, however, preferably includes downwardly extending flange portions 76 and 78 on side 72 and 74 respectively. The flange portions are provided with threaded apertures 75, through which mating screws 77 may be inserted on at least one side. Screws 77 may be used to secure lower platform 52 to negative platform 22 of enlarger 10 as illustrated in FIGS. 4 and 5. It should be noted that in FIG. 5 arms 46 have been omitted for clarity.

The upper and lower platforms are preferably manufactured from aluminum, the lower platform preferably having a thickness of about one-eighth of an inch, and the upper platform preferably having a thickness of about three-sixteenths of an inch. As is prudent with most darkroom apparatus, it is preferable that upper and lower platforms 54 and 52, and all other major components of negative stage 50 described below, are finished in a matt-black finish.

Continuing now with reference to FIGS. 2, 3, 4, 5, and 6, upper and lower platforms 52 and 54 are aligned in a generally face-to-face relationship. The platforms are preferably spaced apart by at least three support-members, at least two, and preferably three of which are extendable in a direction generally perpendicular to the platforms for adjusting spacing and alignment of the platforms relative to each other. In this preferred embodiment of the present invention, three such extendable support-members are provided by three adjusting screws 80.

It will be evident to those familiar with the art that while, in theory at least, four or more support members may be provided, any number greater than three will complicate, rather than facilitate, the alignment process.

Figure 6:
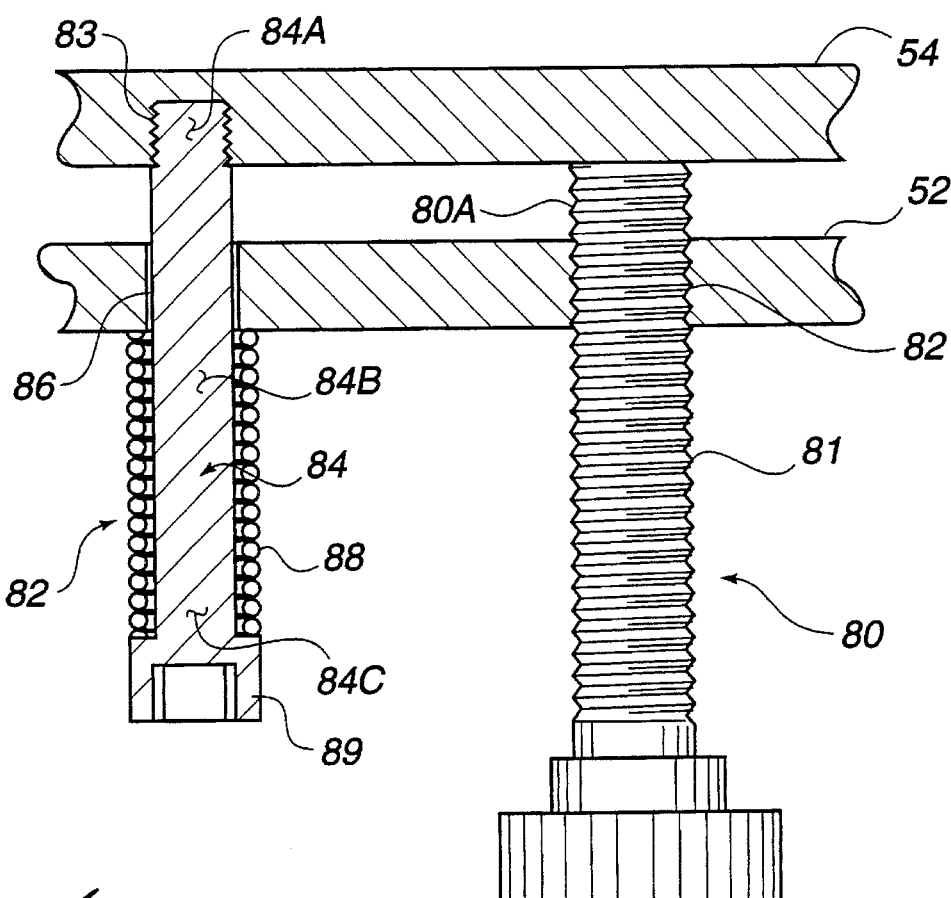
FIG. 6 is a cross-section view seen generally in the direction 6—6 of FIG. 3 schematically illustrating detail of the arrangement of adjusting screws and spring loading shafts in the negative stage of FIG. 3.

Adjusting screws 80 extend through lower platform 52, in a direction generally perpendicular thereto, via mating threaded apertures 82 therein (see FIG. 6). Upper portions 80A of the screws form the support-members. The screws are simply turned to extend or retract the support-members in a direction generally perpendicular to lower platform 52.

Figure 3:
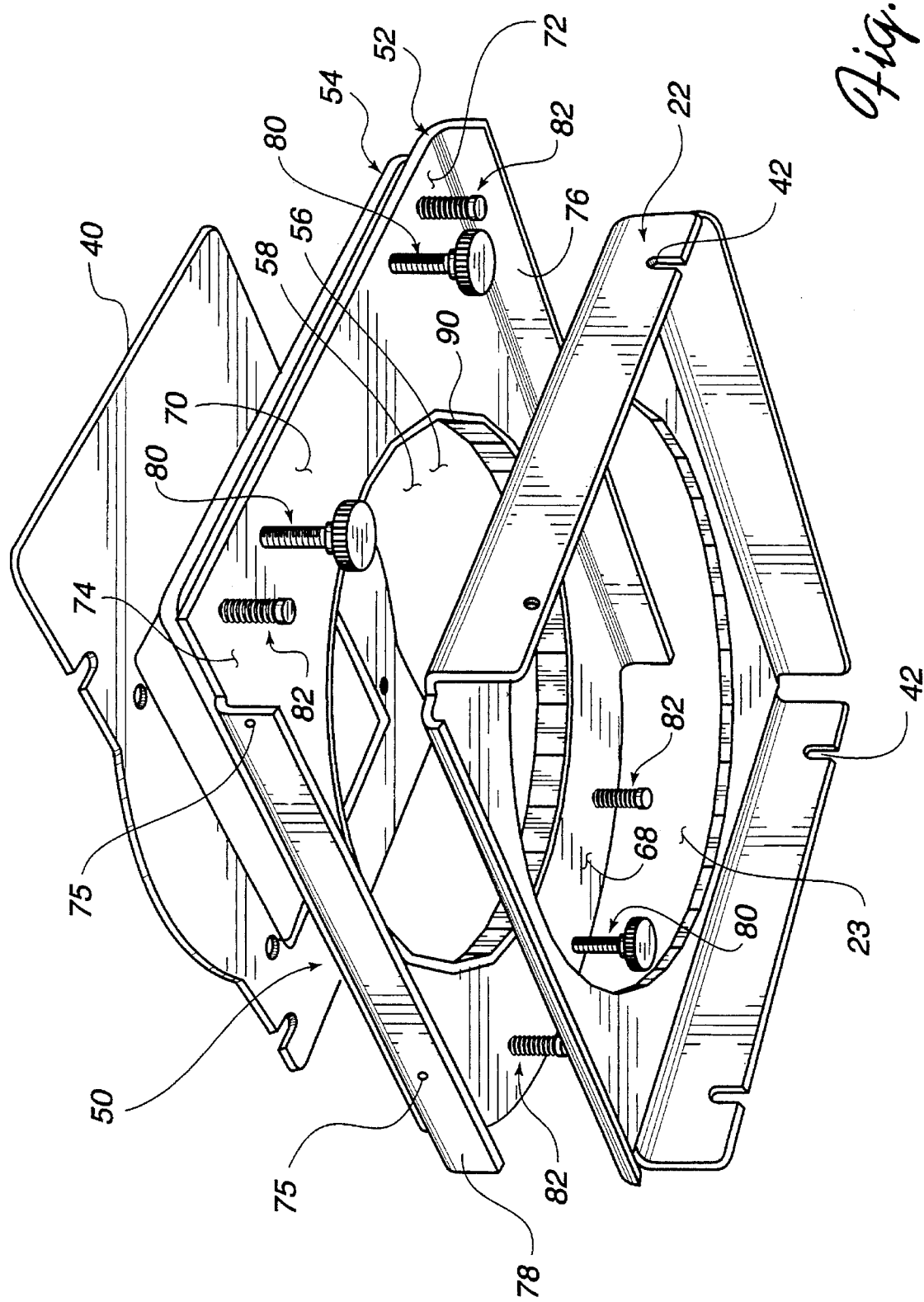
FIG. 3 is an exploded perspective view from below schematically illustrating the negative stage of FIG. 3 together with cooperative components of the enlarger apparatus of FIG. 1.

The adjusting screws 80 are preferably arranged, essentially at the corners of a triangle, with two thereof proximate end 70, and one thereof proximate end 68 of lower platform 52 (se FIG. 3). Negative stage 50 is arranged to be installed in enlarger 10 with end 70 of lower platform 52 overhanging negative platform 22 and to the left of a user. When negative stage 50 is installed in this way, two adjusting screws 80 are accessible to a user (see FIG. 5). These two adjusting screws (and the third if necessary) are used to adjust the relative inclination and spacing of upper and lower platforms 54 and 52.

Means are preferably provided for maintaining upper platform 54 in contact with support member portions 80A of adjusting screws 80. A convenient arrangement includes a plurality of spring loaded plungers 82 (see FIG. 3). At least three such plungers are required, with four being a preferred number. They are preferably arranged with a first two thereof located proximate end 62 of upper platform 54, and a second two thereof proximate end 60 of upper platform 54.

Referring to FIG. 6 for detail, a preferred embodiment of a plunger 82 includes a shaft 84 attached at one end 84A thereof to upper platform 54. Preferably, shaft 84 is the shaft of a screw which is screwed into a mating threaded aperture 83 in upper platform 54. Shaft 84 extends from the upper platform, in a direction generally perpendicular thereto, through a corresponding clear aperture 86 in lower platform 52, such that lower portion 84B of shaft 84 extends below the platform. A coil spring 88 is arranged axially around lower portion 84B of shaft 84, and is maintained in compression against lower platform 52 by means at end 84C of shaft 84, conveniently provided here by screw head 89.

Force provided by coil springs 88 not only provides the force necessary to maintain upper platform 54 in contact with adjusting screws 80, but also maintains screw threads 81 of adjusting screws 80 in tight contact with mating threaded apertures 82. Because of this, both upper and lower platforms 54 and 52 are maintained in tight contact with adjusting screws 80, i.e., in contact with the support-members.

As upper and lower platforms 54 and 52 are generally spaced apart during use, a baffle arrangement is preferably provided to prevent leakage of light between the platforms, i.e., in a direction parallel to the plane of the platforms. The baffle arrangement thus prevents light from escape into a darkroom in which enlarger 10 is located, possibly causing fogging of photographic materials in the dark room, or even a print instantly being exposed in the enlarger.

Referring now to FIG. 7, one preferred baffle arrangement includes a baffle-ring 90 attached to upper platform 54 and tightly encircling aperture 58 therein. Aperture 56 in lower platform 52 has a slightly larger diameter than aperture 58, sufficiently large that baffle-ring 90 may extend downwards from upper platform 54 into aperture 56 in lower platform 52. The difference in diameters should be sufficient that there is a clearance of about one millimeter between baffle ring 90 and aperture 56. This is sufficient to allow unhampered relative movement between the platforms without compromising light-baffling effectiveness.

Alternatively, as illustrated in FIG. 8, aperture 58 may have a diameter greater than the diameter of aperture 56, and baffle-ring 90 may extend from lower platform 52 into aperture 58 in upper platform 54. Clearly, in either of the above-described arrangements, baffle-ring 90 should not extend above upper platform 54 or below lower platform 52, otherwise it will interfere with seating of negative stage 50 on negative platform 22, or with seating of negative holder 40 on upper platform 54.

A third, non-exhaustive, baffle arrangement may include baffle-rings 90 and 92 attached respectively to upper and lower platforms 54 and 52, with baffle-ring 90 arranged to fit within baffle-ring 92. This arrangement provides a greater range of spacing between the upper and lower platforms while still providing effective light-baffling.

Referring to FIG. 10, it is pointed out that while negative stage 50 has been described above as an accessory device which may be easily installed in and removed from a existing enlarger, it may also be installed by an enlarger manufacturer as an original-equipment alignable negative stage. This may be accomplished simply by dispensing with the conventional negative platform 22 and, in its stead, attaching lower platform 52 of negative stage 50 directly to bellows unit 36.

While the negative stage of the present invention has been described in terms of an embodiment wherein relative inclination and height are adjustable, in many applications height adjustment will not be necessary. Referring now to FIGS. 11, 12, 13, and 14, another embodiment 51 of the present invention is depicted wherein only inclination of upper and lower platforms 54 and 52 with respect to each other is adjustable.

Negative stage 51 includes only two adjusting screws 80 and a fixed pivot-member 180 for spacing apart upper and lower platforms 54 and 52. Adjusting screws 80 are located proximate a front end 53 of lower platform 52. Adjusting screws 80 are adjustable in the manner described above. It has been found convenient but not essential to provide a lock-nut 181 for each of the adjusting screws for preventing accidental operation of screws 80 and consequent misalignment of negative stage 51. Pivot member 180 is located proximate end 55 of lower platform 52. Pivot member 180 may be conveniently formed by pressing a dimple into sheet material used to form lower platform 52.

Upper platform 54 is held in contact with adjusting screws 80 and pivot-member 180 by two spring loaded plungers 82 which are configured and operate in the manner described above for negative stage 50. One spring loaded plunger is located proximate each of adjusting screws 80. Adjusting screws 80 and pivot member 180 are located at the corners of a triangle indicated whimsically in FIG. 13 by broken line 184. Inclination of upper and lower platforms 54 and 52 with respect to each other is accomplished by adjusting one or both of adjusting screws 80.

Figure 14:
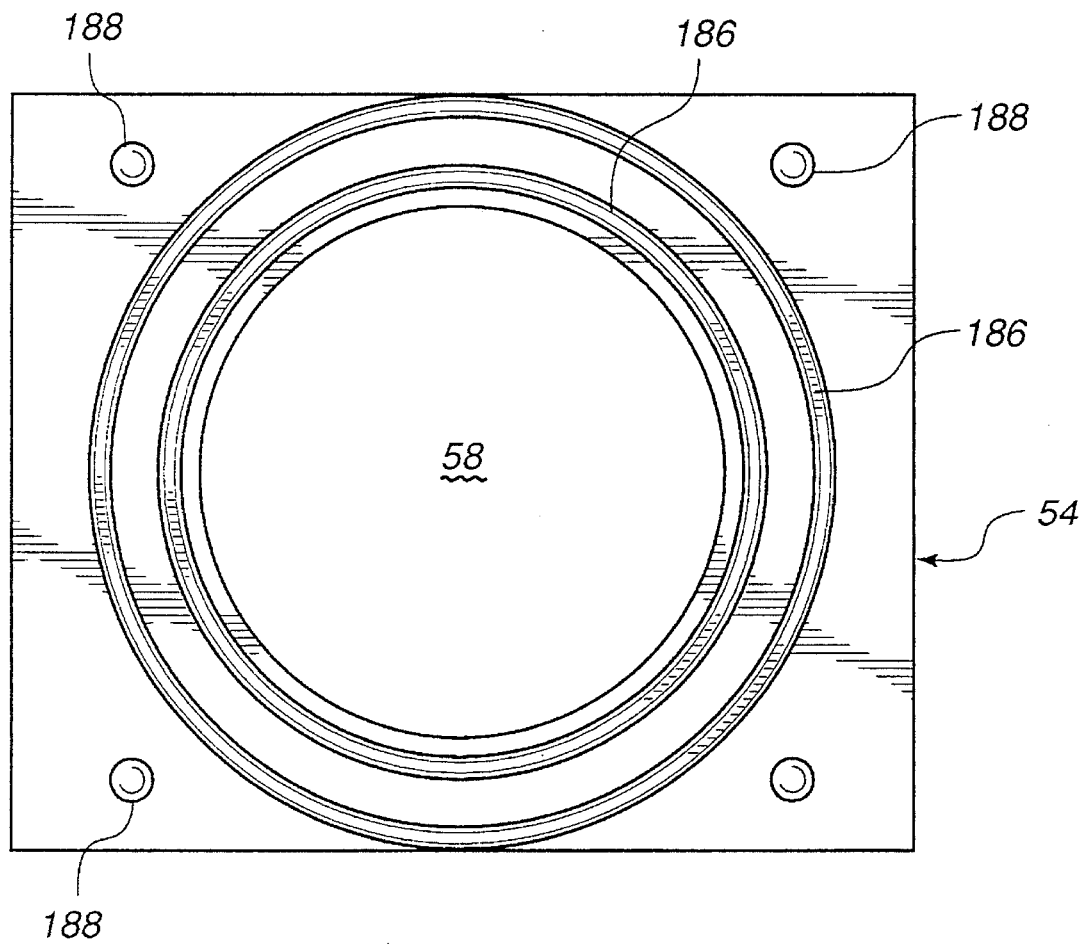
FIG. 14 is a plan view from above schematically illustrating circular ridges and raised portions on an upper platform of the negative stage of FIG. 11.

Continuing now with reference to FIGS. 11 and 12, and additionally to FIG. 14. Upper platform 54 is provided with circular ridges 186 on upper surface 57 thereof. These ridges are generally concentric with aperture 58 in the platform. Located proximate corners of surface 57 are dimpled or raised portions 188. Ridges 186 and raised portions 188 are initially formed and arranged to have about the same height above surface 57. The ridges and raised portion, after initial formation, can then be quickly ground so that the ridges and raised portions are co-planar. This provides co-planar support points for a negative holder, which reduces the possibility that the negative holder will not seat properly on the platform.

In summary, an alignable negative stage for a photographic enlarger apparatus has been described. The negative stage is designed to be cooperative with optical alignment apparatus for aligning principle planes of the enlarging apparatus. In one preferred embodiment, a negative to be enlarged rests on an upper platform which is adjustably supported on a lower platform by a fixed pivot-member and two adjusting screws. The upper platform is moveable against restraint of a spring loaded system for maintaining both platforms in contact with the pivot-member and the adjusting screws.

The spring-loaded support system, or "floating-support" system, has been found effective in maintaining a flat upper platform for the negative, both during and after alignment. Because of this, there is a high degree of certainty that the negative, when placed on the platform, will lie thereon in the same alignment as an optical alignment apparatus which had been used to align the negative stage.

While principles of the invention have been described with reference to a particular enlarger type, the description given above will enable those skilled in the art to devise embodiments of the invention which are adaptable to enlarger types other than the type described.

The present invention has been described in terms of a preferred embodiment and a number of other embodiments. The invention however is not limited to the embodiments described and depicted. Rather, the scope of the invention is defined by the appended claims.

What is claimed is:

1. A negative stage for a photographic enlarger comprising:

a lower platform and an upper platform, each of said platforms having an aperture therein for allowing passage of light therethrough from a light source in the enlarger, and said upper platform arranged for supporting a photographic negative holder thereon;

said platforms aligned in a face-to-face relationship with said apertures therein generally in alignment, said platforms spaced apart by a fixed pivot-member and only two adjusting screws, said adjusting screws extending generally perpendicularly through said lower platform via mating threaded apertures therein, and extendable in a direction generally perpendicular to said platforms;

spring loading means for maintaining said platforms in contact with said pivot-member and said adjusting screws; and said adjusting screws and said spring loading means arranged such that inclination of the platforms with respect to each other may be adjusted by turning said adjusting screws.

2. The negative stage of claim 1, further including light-baffle means arranged around said apertures and extending between said platforms for preventing leakage of the light therebetween.

3. A negative stage for a photographic enlarger, comprising:

a generally flat lower platform and a generally flat upper platform, each of said platforms having an aperture therein for allowing passage of light therethrough from a light source in the enlarger, and said upper platform arranged for supporting a photographic negative holder thereon;

said platforms aligned in a face-to-face relationship with said apertures therein generally in alignment, and said platforms spaced apart by a fixed pivot-member and only two adjusting screws, each of said adjusting screws extending generally perpendicularly through said lower platform via a mating threaded aperture therein;

said platforms each generally rectangular and of about the same rectangular dimensions, each thereof having two opposite generally straight sides, and first and second ends, and said pivot-member and said adjusting screws arranged at the corners of a triangle with said adjusting screws proximate the first end of said lower platform and said pivot-member proximate the second end of said lower platform;

spring loading means for maintaining said platforms in contact with said pivot-member and said adjusting screws, said spring loading means including two shafts, each thereof having first and second ends, each of said shafts attached at the first end thereof to said upper platform and extending freely through said lower platform via a corresponding aperture therein such that a lower portion of said shaft extends below said lower platform, and each of said shafts having a coil spring arranged axially around the lower portion thereof, and having means at the second end thereof for maintaining said coil spring in compression against said lower platform; and said adjusting screws and said spring loading means arranged such that inclination of the platforms with respect to each other may be adjusted by turning said adjusting screws.

4. In a photographic enlarger including a negative stage for supporting a photographic negative, the invention characterized in that the negative stage comprises:

a generally flat lower platform and a generally flat upper platform, each of said platforms having an aperture therein for allowing passage of light therethrough from a light source in the enlarger, and said upper platform arranged for supporting the photographic negative holder thereon;

said platforms aligned in a face to face relationship with said apertures generally in alignment, said platforms spaced apart by a pivot-member and only two adjusting screws, said adjusting screws extending generally perpendicularly through said lower platform via mating threaded apertures therein, said adjusting screws moveable in a direction generally perpendicular to said platforms;

spring loading means for maintaining said platforms in contact with pivot-member and said adjusting screws; and said adjusting screws and said spring loading means arranged such that inclination of the platforms with respect to each other may be adjusted by turning said adjusting screws.

5. In the photographic enlarger of claim 4, the invention further characterized in that said spring loading means includes two shafts, one thereof positioned proximate each of said adjusting screws, each of said shafts having first and second ends, each of said shafts attached at the first end thereof to said upper platform and extending freely through said lower platform via a corresponding aperture therein such that a lower portion of said shaft extends below said lower platform, and each of said shafts having a coil spring arranged axially around said lower portion thereof, and having means at the second end thereof for maintaining said coil spring in compression against said lower platform.

* * * * *